United States Patent
Kikuchi

(10) Patent No.: US 6,759,456 B2
(45) Date of Patent: Jul. 6, 2004

(54) RUBBER COMPOSITION

(75) Inventor: Naohiko Kikuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/226,171

(22) Filed: Aug. 23, 2002

(65) Prior Publication Data

US 2003/0100643 A1 May 29, 2003

(30) Foreign Application Priority Data

Aug. 24, 2001 (JP) ........................................ 2001-254609

(51) Int. Cl.⁷ ................................................. C08K 5/04
(52) U.S. Cl. ........................ 524/81; 524/426; 524/425; 524/444
(58) Field of Search .......................... 524/81, 425, 444, 524/426

(56) References Cited

U.S. PATENT DOCUMENTS

| | | | | |
|---|---|---|---|---|
| 4,315,955 A | * | 2/1982 | Cramer | ........................ 426/585 |
| 5,385,459 A | * | 1/1995 | Graves et al. | ................ 425/52 |
| 5,624,990 A | * | 4/1997 | Vipperman | .................. 524/425 |

FOREIGN PATENT DOCUMENTS

| | | | |
|---|---|---|---|
| EP | 0 921 150 A | | 6/1999 |
| JP | 55-112247 | * | 8/1980 |
| JP | 58074731 A | | 5/1983 |
| JP | 60031546 A | | 2/1985 |
| JP | 8302077 A | | 11/1996 |
| JP | 2001089619 A | | 4/2001 |

OTHER PUBLICATIONS

Database WPI, Section Ch, Week 198041, Derwent Publications Ltd., London GB, XP002216146, Aug. 29, 1980, Abstract.

* cited by examiner

*Primary Examiner*—Ling-Siu Choi
(74) *Attorney, Agent, or Firm*—Birch, Stewart Kolasch & Birch, LLP

(57) ABSTRACT

A rubber composition comprises 5 to 150 parts by weight of an inorganic filler, 0 to 30 parts by weight of a silane coupling agent and 5 to 100 parts by weight of a vegetable oil having an iodine number of at most 130, based on 100 parts by weight of a diene rubber. A natural rubber is preferably used as the diene rubber. The rubber composition can reduce rolling resistance with decreasing the amount of petroleum oils to be used.

1 Claim, No Drawings

RUBBER COMPOSITION

BACKGROUND OF THE INVENTION

The present invention relates to a rubber composition which can reduce rolling resistance.

Petroleum oils such as aromatic oil have been used as softening agent in a rubber composition for a tire. However, there has been a problem that rolling resistance is increased and fuel efficiency is lowered when petroleum oils are blended. In recent years, due to the serious interest in the global environmental problems, demand for new softening agent alternative to petroleum oils is growing.

SUMMARY OF THE INVENTION

An object of the present invention is to provide a novel rubber composition which can reduce rolling resistance, decreasing the amount of petroleum oils to be used.

Examining the solution, it has been found that rolling resistance can be reduced by using particular vegetable oils instead of petroleum oil, and the present invention has been completed.

That is, the present invention relates to a rubber composition comprising 5 to 150 parts by weight of an inorganic filler, 0 to 30 parts by weight of a silane coupling agent and 5 to 100 parts by weight of a vegetable oil having an iodine value of at most 130, based on 100 parts by weight of a diene rubber.

It is preferable to use a natural rubber as the diene rubber in the rubber composition.

DETAILED DESCRIPTION

The rubber composition of the present invention comprises a diene rubber, an inorganic filler and a vegetable oil.

Examples of diene rubber are synthetic rubbers such as styrene-butadiene rubber (SBR), butadiene rubber (BR) and butyl rubber (IIR); and natural rubbers. Such diene rubbers may be used alone or in combination of two or more. Natural rubbers are preferable from the viewpoint of reducing rolling resistance. The amount of natural rubber is preferably at least 75% by weight, more preferably at least 85% by weight based on the diene rubber. When the amount of natural rubber is less than 75% by weight, reduction of rolling resistance tends to be small.

The inorganic filler is used as an alternative to carbon black which has been often used as a reinforcing filler. By reducing the amount of carbon black with using the inorganic filler alternatively, rolling resistance can be reduced.

Examples of inorganic fillers are silica, sericite, calcium carbonate, clay, alumina, aluminum hydroxide, magnesium hydroxide, magnesium oxide and titanium oxide. Among them, silica is preferable to ensure the reinforcement of the rubber.

When silica is used, it is preferable that silica has a BET specific surface area of 150 to 250 $m^2/g$. When the BET specific surface area of silica is less than 150 $m^2/g$, reinforcing property tends to be inferior. When the BET specific surface area of silica is more than 250 $m^2/g$, there is a tendency that dispersibility is inferior, agglomeration is caused and thus physical properties are decreased.

The amount of inorganic filler is 5 to 150 parts by weight based on 100 parts of the diene rubber. When the amount of inorganic filler is less than 5 parts by weight, reinforcing property tends to be insufficient. When the amount of inorganic filler is more than 150 parts by weight, processability tends to be inferior. The lower limit of the amount of inorganic filler is preferably 30 parts by weight, more preferably 40 parts by weight. The upper limit of the amount of inorganic filler is preferably 120 parts by weight, more preferably 100 parts by weight.

The amount of inorganic filler is at least 75% by weight, preferably at least 85% by weight based on the total amount of fillers. When the amount of inorganic filler is less than 75% by weight, reduction of rolling resistance tends to be small.

It is preferable to use a silane coupling agent together with the inorganic filler. There is no particular limit for the kind of silane coupling agent as long as it is currently used in the field of production of tires. Examples of silane coupling agent are bis(3-triethoxysilylpropyl)tetrasulfide, bis(3-trimethoxysilylpropyl)tetrasulfide, bis(2-triethoxysilylpropyl)tetrasulfide, 3-mercaptopropyltriethoxysilane and 2-mercaptoethyltrimethoxysilane. These silane coupling agents may be used alone or in any combination. Among these, bis(3-triethoxysilylpropyl)tetrasulfide and 3-mercaptopropyltriethoxysilane are preferable from the viewpoint of reinforcing property of silane coupling agent and the resulting processability. Furthermore, bis(3-triethoxysilylpropyl)tetrasulfide is particularly preferable from the viewpoint of processability.

It is preferable that the amount of silane coupling agent is 0 to 30 parts by weight based on the 100 parts of the diene rubber.

It is also preferable that the amount of silane coupling agent is 3 to 20% by weight based on inorganic fillers. When the amount of silane coupling agent is less than 3% by weight, the effect of adding silane coupling agent is insufficient. When the amount of silane coupling agent is more than 20% by weight, the effect to be obtained remains small in spite of cost increase.

As to the vegetable oil, those having a low unsaturation degree are preferable. For example, semi-drying oils having an iodine number of 100 to 130, non-drying oils and solid oils having an iodine number of at most 100 are preferable. Herein, the iodine number is defined as the amount of iodine based on gram, which can be absorbed by 100 g of oil. Concrete examples of these vegetable oils are semi-drying oils such as cotton seed oil and rape seed oil; non-drying oils such as castor oil and arachis oil; and solid oils such as palm oil and cocoanut oil. When the iodine number of vegetable oil is more than 130, there is a tendency that tan δ is increased and hardness is lowered, resulting in increase of rolling resistance and decrease of steering stability. More preferable upper limit of the iodine number of the vegetable oil is 120.

The amount of vegetable oil is 5 to 100 parts by weight based on 100 parts of the diene rubber. When the amount of vegetable oil is less than 5 parts by weight, softening effect on rubber tends to be insufficient. When the amount of vegetable oil is more than 100 parts by weight, processability tends to decrease. Preferable upper limit of the amount of vegetable oil is 80 parts by weight.

Further, it is preferable that the vegetable oil accounts for at least 75% by weight, particularly at least 85% by weight of the total oil. When the amount of vegetable oil is less than 75% by weight, lowering effect of rolling resistance tends to be inferior.

It is preferable to blend vegetable oil so that the hardness of rubber becomes 40 to 90 after vulcanization. When the hardness of rubber is less than 40, there is a tendency that required rigidity cannot be achieved. When the hardness of rubber is more than 90, processability tends to be inferior.

The rubber composition of the present invention may be incorporated with wax, antioxidant, cured resin, adhesive, stearic acid, zinc oxide, vulcanization accelerator, sulfur and the like, in addition to diene rubber, inorganic filler, silane coupling agent and vegetable oil.

The rubber composition of the present invention is obtained by kneading the above components and can be used as tire parts by molding into tread side wall, case, inner liner, breaker and bead. In particular, it is preferable to use the rubber composition of the present invention for tread from the viewpoint that the tread contributes largely to the reduction of rolling resistance.

When preparing a case, natural fibers such as rayon and acetate made from wood pulp or cupra made from cotton seed crude linter may be useful instead of commonly used synthetic fibers. Among them, rayon is preferable because rayon has a high strength required for tires.

EXAMPLES

The present invention is explained in detail based on Examples below, but not limited thereto. "Part(s)" and "%" in the following examples mean "part(s) by weight" and "% by weight", respectively, unless otherwise specified.

Materials used in Examples and Comparative Examples are summarized below.

SBR: SBR1502 available from Sumitomo Chemical Co., Ltd.
BR: BR150B available from Ube Industries, Ltd.
IIR: C1-IIR1068 available from Exxon Chemical Japan Ltd.
Natural rubber: RSS #3
Carbon black (ISAF): Diablack I available from Mitsubishi Chemical Corporation
Carbon black (FEF): Diablack E available from Mitsubishi Chemical Corporation
Carbon black (GPF): Diablack G available from Mitsubishi Chemical Corporation
Carbon black (HAF): Diablack HA available from Mitsubishi Chemical Corporation
Carbon black (LM-HAF): Diablack LH available from Mitsubishi Chemical Corporation
Silica: Ultrasil VN3 available from Degussa Hules Co.
Coupling Agent: Si-69 available from Degussa Hules Co.
Sericite: KM-S available from Nippon Forum Co., Ltd.
Calcium carbonate: Hakuenka CC available from SHIRAISHI KOGYO KAISHA LTD.
Aromatic oil: Process X-140 available from Japan Energy Corporation
Mineral oil: Diana Process PA32 available from Idemitsu Kosan Co., Ltd.
Vegetable oil: Purified palm oil J(S) available from Nisshin Oil Mills, Ltd.
Wax: Ozoace 0355 available from Nippon Seiro Co., Ltd.
Antioxidant: Antigen 6C available from Sumitomo Chemical Co., Ltd.
Cured resin: Sumilite resin PR 12686 available from Sumitomo Bakelite Co., Ltd.
Adhesive (COST): COST-F available from Japan Energy Corporation
Adhesive (S.620): Sumicanol 620 available from Sumitomo Chemical Co., Ltd.
Stearic Acid: Stearic acid Tsubaki available from NOF Corporation
Zinc oxide: Zinc Oxide available from Mitsui Mining and Smelting Co., Ltd.
Sulfur: powdery sulfur available from Tsurumi Chemicals Co., Ltd. Vulcanization Accelerator: Nocceler NS available from Ohuchi Shinko Kagaku Kogyo Co., Ltd.

Example 1

Kneading was carried out according to compounds listed in Table 1, and tread A (40% of the tire weight), side wall A (17% of the tire weight), inner liner A (8% of the tire weight), clinch apex A (3% of the tire weight), bead apex A (5% of the tire weight), breaker topping A (8% of the tire weight) and carcass ply topping A (3% of the tire weight) were formed. Steel cord (8% of the tire weight) was used for the breaker, and cord (5% of the tire weight) made of 1840 dtex/2 rayon was used for the carcass ply.

An unvulcanized tire was prepared by assembling the above components and other parts (3% of the tire weight) on a tire forming machine in a usual manner, and the unvulcanized tire was heated and pressed in a vulcanizing machine to obtain a tire having a size of 195/65R15 91S.

Comparative Example 1

Kneading was carried out according to compounds listed in Table 1, and tread B, side wall B, inner liner B, clinch apex B, bead apex B, breaker B and carcass ply B were formed. By using these parts, a conventional tire was prepared in the same manner as in Example 1 except that a cord made of 1670 dtex/2 polyester was used for the carcass ply.

TABLE 1

| Compound (part by weight) | Tread | | Side wall | | Inner liner | | Clinch apex | | Bead apex | | Breaker topping | | Carcass ply topping | |
|---|---|---|---|---|---|---|---|---|---|---|---|---|---|---|
| | A | B | A | B | A | B | A | B | A | B | A | B | A | B |
| SBR | — | 80 | — | — | — | — | — | — | — | 30 | — | — | — | 30 |
| BR | — | — | 60 | 60 | — | — | — | 70 | — | — | — | — | — | — |
| IIR | — | — | — | — | 70 | 70 | — | — | — | — | — | — | — | — |
| Natural rubber | 100 | 20 | 40 | 40 | 30 | 30 | 100 | 30 | 100 | 70 | 100 | 100 | 100 | 70 |
| ISAF | — | 80 | — | — | — | — | — | 65 | — | — | — | — | — | — |
| FEF | — | — | — | 50 | — | — | — | — | — | — | — | — | — | — |
| GPF | — | — | — | — | — | 65 | — | — | — | — | — | — | — | — |
| HAF | — | — | — | — | — | — | — | — | — | 70 | — | — | — | 45 |
| LM-HAF | — | — | — | — | — | — | — | — | — | — | — | 60 | — | — |
| Silica | 85 | 10 | 55 | — | 60 | — | 60 | — | 70 | — | 60 | — | 50 | — |
| Coupling agent | 6.8 | 0.8 | 4.0 | — | 4.8 | — | 4.8 | — | 5.6 | — | 4.8 | — | 4.0 | — |
| Sericite | — | — | — | — | 20 | — | 20 | — | — | — | — | — | — | — |
| Calcium carbonate | — | — | — | — | — | 20 | — | — | — | — | — | — | — | — |

TABLE 1-continued

| Compound | Tread | | Side wall | | Inner liner | | Clinch apex | | Bead apex | | Breaker topping | | Carcass ply topping | |
|---|---|---|---|---|---|---|---|---|---|---|---|---|---|---|
| (part by weight) | A | B | A | B | A | B | A | B | A | B | A | B | A | B |
| Aromatic oil | — | 45 | — | 5 | — | 9 | — | 8 | — | 5 | — | — | — | 9 |
| Mineral oil | — | — | — | — | — | 9 | — | — | — | — | — | 5 | — | — |
| Vegetable oil | 30 | — | 5 | — | 9 | — | 8 | — | 5 | — | 5 | — | 9 | — |
| Wax | 1.20 | 1.20 | 1.20 | 1.20 | — | — | 1.20 | 1.20 | — | — | — | — | — | — |
| Antioxidant | 1.50 | 1.50 | 1.50 | 1.50 | 1.50 | 1.00 | 1.50 | 1.50 | — | — | 2.00 | 2.00 | — | — |
| Cured resin | — | — | — | — | — | — | — | — | 15.00 | 15.00 | — | — | — | — |
| Adhesive (COST) | — | — | — | — | — | — | — | — | — | — | 1.00 | 1.00 | — | — |
| Adhesive (S.620) | — | — | — | — | — | — | — | — | — | — | 1.00 | 0.00 | — | — |
| Stearic acid | 2.50 | 2.50 | 2.50 | 2.50 | 1.50 | 1.50 | 2.50 | 2.50 | 2.50 | 2.50 | — | — | 2.50 | 2.50 |
| Zinc oxide | 3.00 | 3.00 | 3.00 | 3.00 | 4.00 | 4.00 | 3.00 | 3.00 | 4.00 | 4.00 | 8.00 | 8.00 | 5.00 | 5.00 |
| Sulfur | 1.50 | 1.50 | 1.50 | 1.50 | 0.75 | 0.75 | 1.80 | 1.80 | 3.00 | 3.00 | 5.00 | 5.00 | 3.00 | 3.00 |
| Vulcanization accelerator | 2.30 | 2.30 | 0.70 | 0.70 | 1.30 | 1.30 | 2.10 | 2.10 | 3.85 | 3.85 | 2.15 | 1.00 | 1.00 | 1.00 |

The tires prepared in Example and Comparative Example were subjected to the following durability test and performance evaluations.

1) High speed durability

Evaluation of high speed durability was carried out in accordance with JIS D4230 "tire for automobiles" S range high speed durability test A.

2) Rolling resistance coefficient (RRC)

Rolling resistance was measured under the condition of speed of 80 km/h, air pressure of 250 kPa and load of 4.0 kN. Rolling resistance coefficient was obtained by dividing the rolling resistance value with the load value, and multiplying the result by $10^4$. The smaller the coefficient is, the lower and the more excellent the heat build-up characteristic is.

3) Braking test

Friction coefficient $\mu$ was determined from the brake stopping distance, which was measured by stopping the automobile mounted with the prepared tire, running at a speed of 100 km/h on dry asphalt road and wet asphalt road. The friction coefficient is represented as an index to the $\mu$ value of Comparative Example 1 as 100.

4) Evaluation test on real automobile

Grip, rigidity and riding comfort characteristics were evaluated by using a real automobile with an engine size of 2000 cc, which was mounted with the prepared tire and run on dry asphalt road and wet asphalt road in a test course. The results are represented in score based on the value of Comparative Example 1 as 6. The higher the score is, the better the properties are. Only well-trained drivers can detect the score difference of 0.5 point.

The results are shown in Table 2. Table 2 shows that the tire of Example 1 has smaller rolling resistance, better fuel consumption and equally excellent high speed durability and other properties compared with the conventional tire of Comparative Example 1.

TABLE 2

| Test | Ex. 1 | Com. Ex. 1 |
|---|---|---|
| High speed durability | Passed | Passed |
| RRC | 80 | 91 |
| Braking test | | |
| Dry $\mu$ (index) | 90 | 100 |
| Wet $\mu$ (index) | 90 | 100 |
| Organoleptic test on automobile | | |
| Dry grip (score) | 5.5 | 6 |
| Wet grip (score) | 5.5 | 6 |
| Rigidity (score) | 5.5 | 6 |
| Riding comfort (score) | 5.5 | 6 |

According to the present invention, rolling resistance can be reduced and fuel consumption can be improved by using vegetable oil instead of petroleum oil. Moreover, it is possible to contribute to the effort of solving environmental problems such as global warming due to $CO_2$ emission, by decreasing the amount of petroleum oils to be used.

What is claimed is:

1. A vehicle tire comprising:
   5 to 150 parts by weight of an inorganic filler,
   0 to 30 parts by weight of a silane coupling agent,
   5 to 100 parts by weight of a vegetable oil having an iodine number of at most 130, and
   100 parts by weight of a diene rubber, wherein the diene rubber comprises at least 75% by weight of natural rubber.

* * * * *